United States Patent [19]
Shibata et al.

[11] 4,075,541
[45] Feb. 21, 1978

[54] DIRECT CURRENT MOTOR CONTROL DEVICE FOR USE IN BATTERY AUTOMOBILES

[75] Inventors: Takanori Shibata; Katsuji Marumoto, both of Hitachi, Japan

[73] Assignee: Keishin Matsumoto, Tokyo, Japan

[21] Appl. No.: 426,650

[22] Filed: Dec. 12, 1973

[30] Foreign Application Priority Data
Dec. 15, 1972   Japan .................................. 47-125240

[51] Int. Cl.² ................................................. H02p 5/00
[52] U.S. Cl. ..................................... 318/139; 318/442; 318/342
[58] Field of Search ............... 318/139, 440, 442, 341, 318/342, 343, 355; 320/16, 4

[56] References Cited
U.S. PATENT DOCUMENTS

| | | |
|---|---|---|
| 3,280,397 | 10/1966 | Bruns ................................... 318/139 |
| 3,384,758 | 5/1968 | Kelley .................................. 318/343 |
| 3,387,194 | 6/1968 | Banks ..................................... 320/7 |
| 3,530,356 | 9/1970 | Aronson ................................. 320/7 |
| 3,728,599 | 4/1973 | Minami ................................ 318/139 |
| 3,853,059 | 8/1973 | Berman ............................... 318/341 |

*Primary Examiner*—Robert K. Schaefer
*Assistant Examiner*—John J. Feldhaus

[57] ABSTRACT

A direct current motor control device for use in battery automobiles comprises a direct current motor to be driven by a plurality of battery groups each battery group delivering an equal voltage. The device comprises a battery change-over thyristor circuit inclusive of a chopper circuit and can control the voltage applied to the motor by means of the chopping operation of the chopping circuit and the series-parallel change-over operation for the battery groups. The series-parallel change-over operation of the battery groups is automatically effected in response to the signal for controlling the control signal of time ratio for the chopper circuit.

1 Claim, 13 Drawing Figures

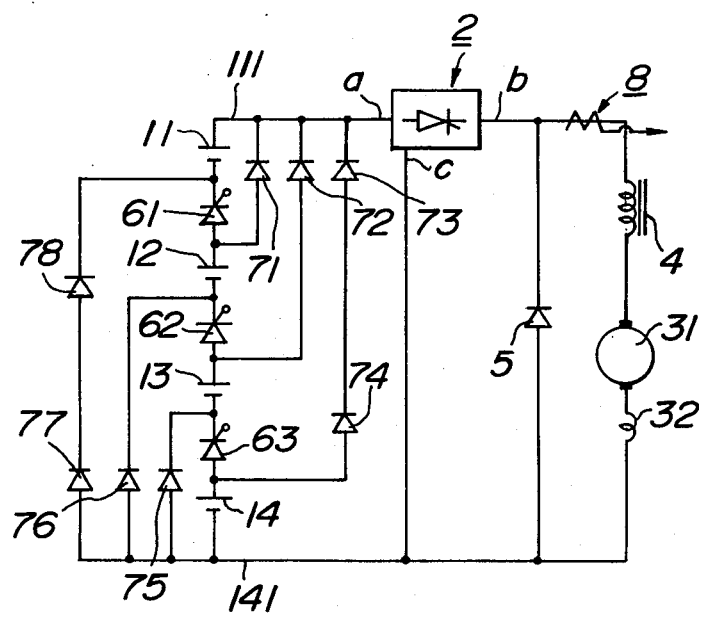
FIG_1

FIG_2
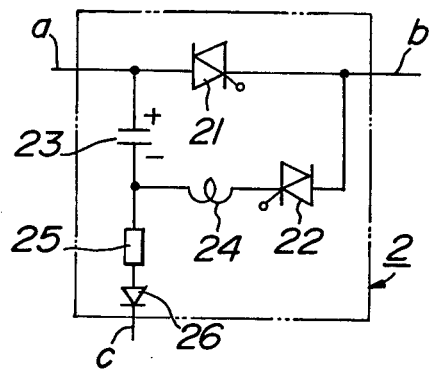
FIG_3
| Step | Thyristors Ignited in Synchronism | | | Output Voltage from Chopper Circuit | Motor Speed |
|---|---|---|---|---|---|
| | 61 | 62 | 63 | | |
| 1 | | | | $\frac{1}{4}E_B \alpha$ | Low |
| 2 | O | | O | $\frac{1}{4}E_B(1+\alpha)$ | Medium |
| 3 | O | O | O | $\frac{1}{2}E_B(1+\alpha)$ | High |

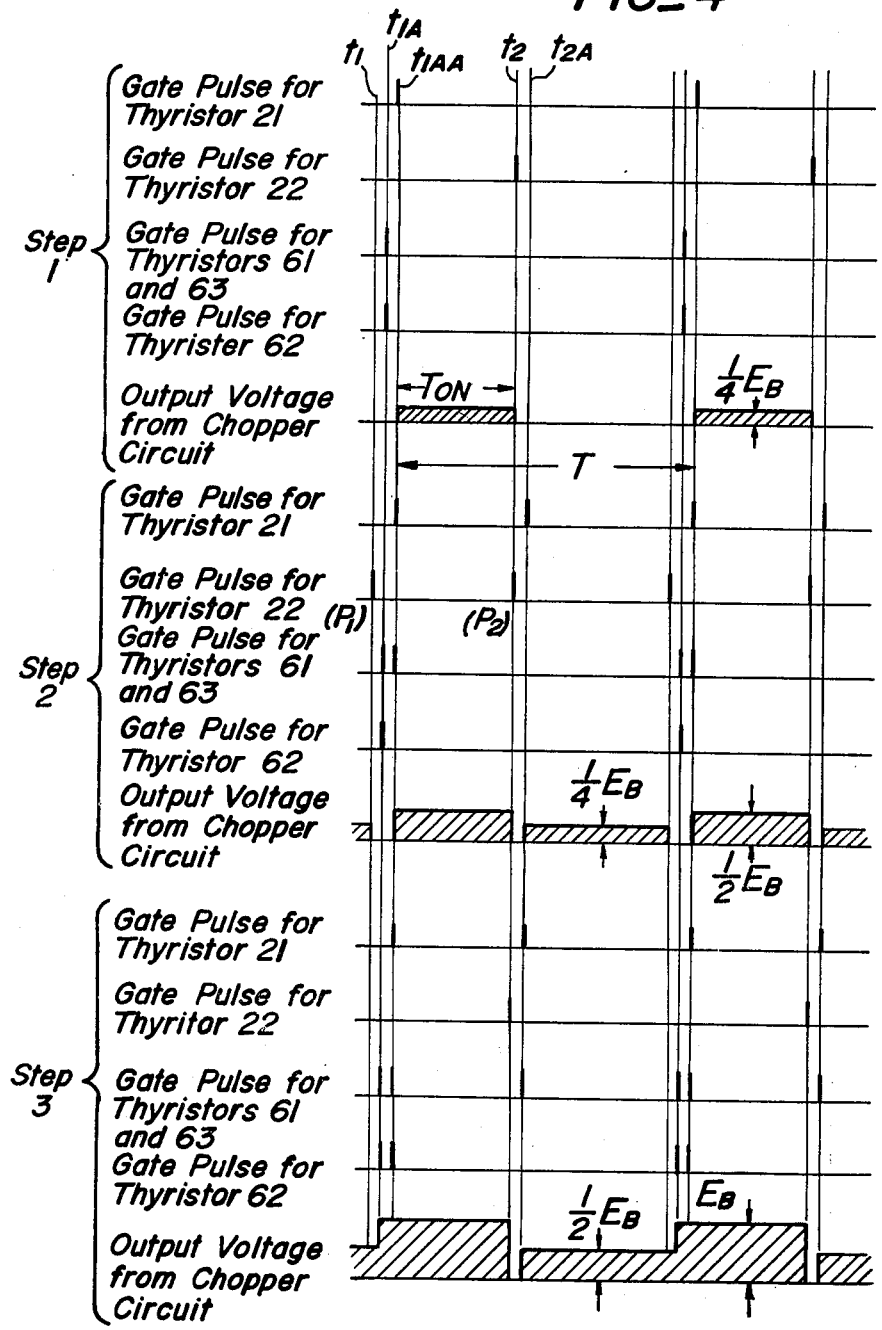

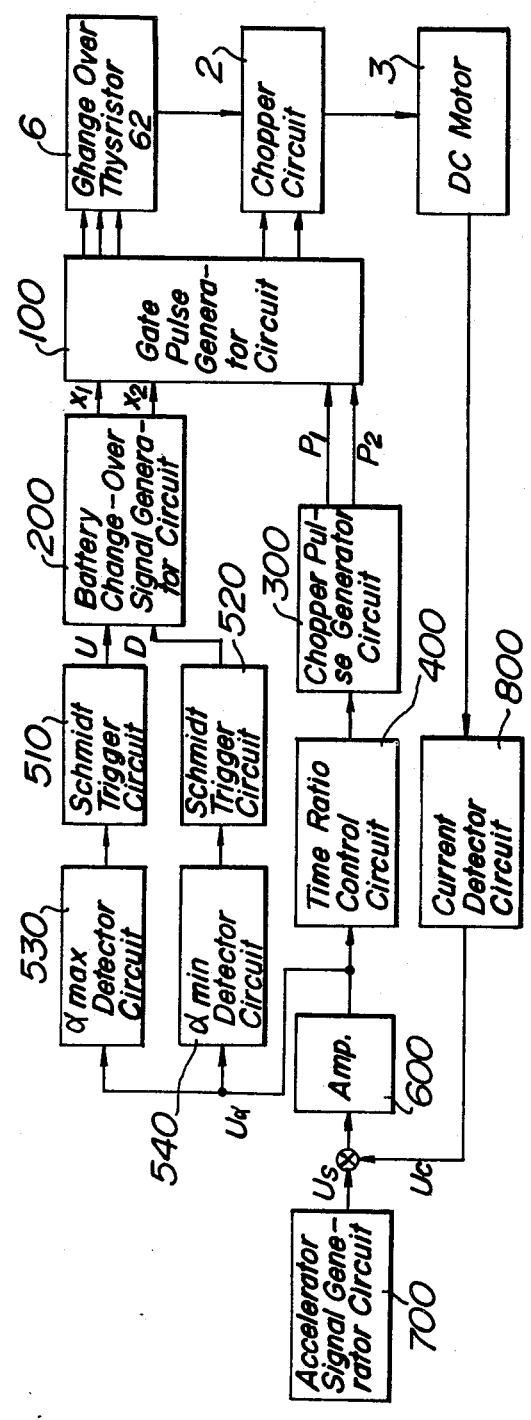
FIG_5

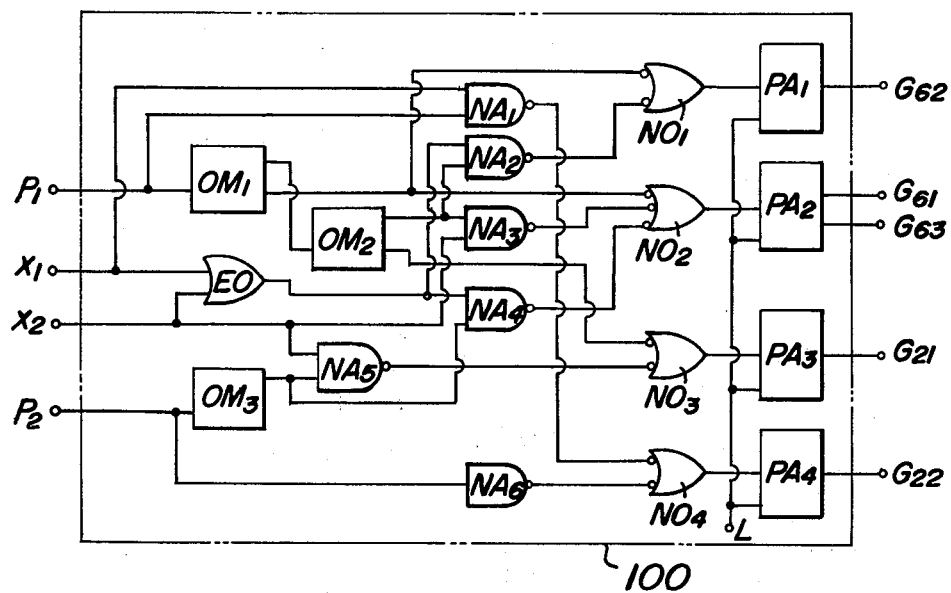
FIG_6

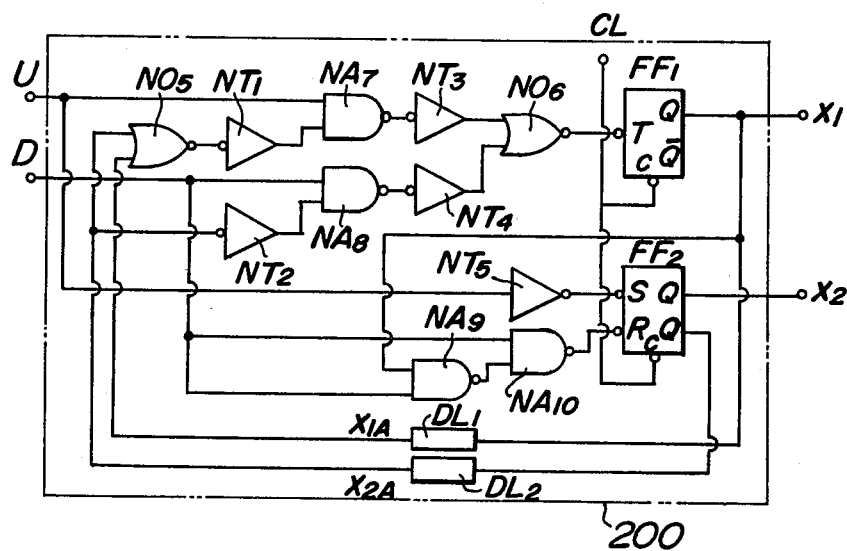
FIG_7
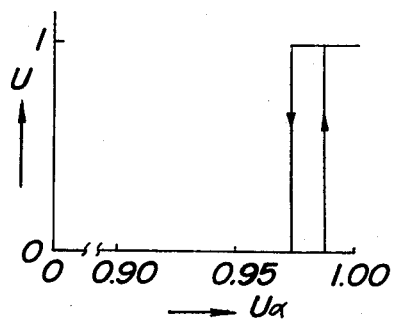
FIG_8a
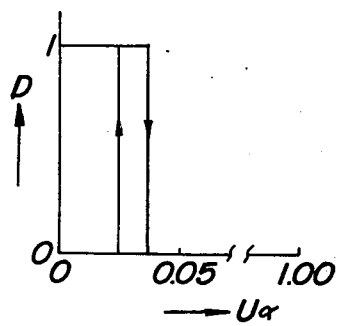
FIG_8b

FIG_9
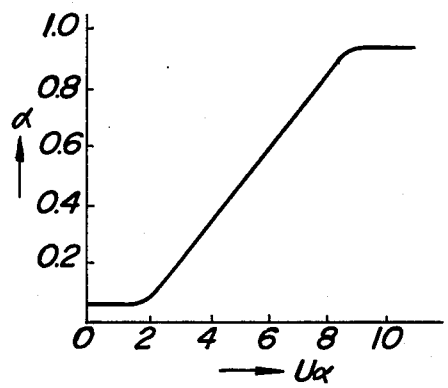
FIG_10
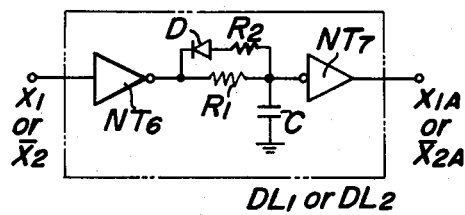

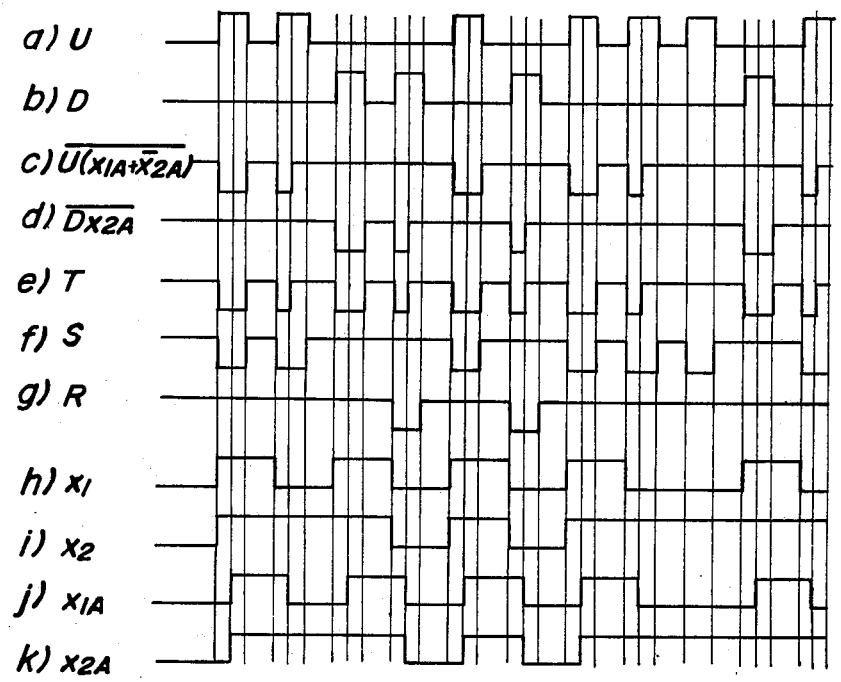
FIG_11

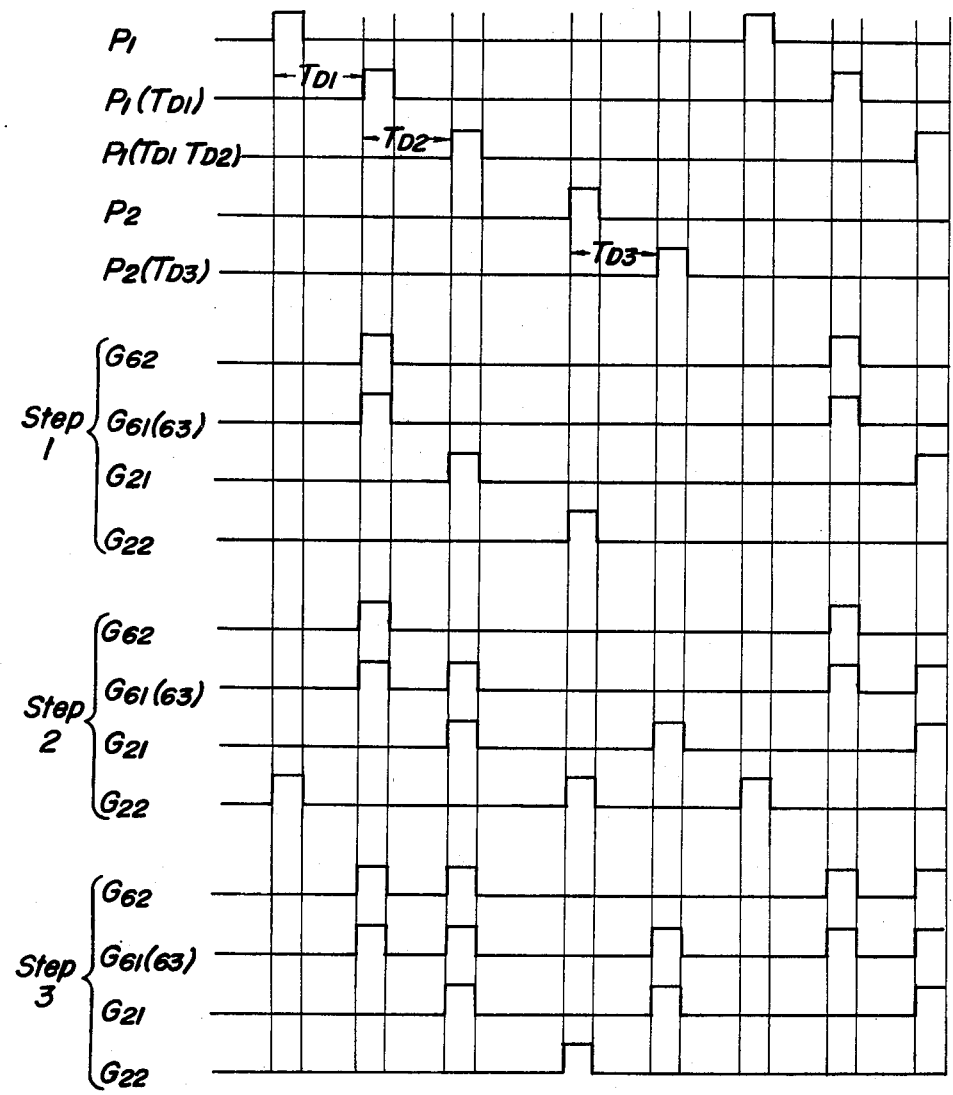
FIG_12

DIRECT CURRENT MOTOR CONTROL DEVICE FOR USE IN BATTERY AUTOMOBILES

BACKGROUND OF THE INVENTION

This invention relates to direct current motor control devices for use in battery automobiles and more particularly to a direct current motor control device for use in battery automobiles which comprises a battery change-over thyristor circuit which is inclusive of a chopper circuit and which can control the voltage applied to the motor by means of the chopping operation of the chopping circuit and the series-parallel change-over operation of the battery groups.

In general, a driving motor for use in battery automobile is supplied with voltage from batteries through a chopper circuit. As the driving motor, a direct current series wound motor is often used due to its output characteristic and for ease of control. Sometimes, however, use may also be made of a shunt wound motor, compound wound motor or permanent magnet field motor.

The value of the average voltage applied to the motor through the chopper circuit is determined by the time ratio of the chopper circuit and by the battery voltage.

Let the time during which the chopper circuit is ON be $T_{on}$, the time during which the chopper circuit is OFF be $T_{off}$, the battery voltage be $E_b$ and the total inductance of the series circuit be L, then the pulsating amplitude $\Delta I_m$ of the motor current is given by $$\Delta I_M = \frac{E_B}{L} \cdot \frac{T_{ON} \cdot T_{OFF}}{T_{ON} + T_{OFF}} \qquad (1)$$

A large pulsating amplitude $\Delta I_m$ of the motor current results in difficult problems that the motor loss becomes increased, that commutating operation becomes worse to involve an abnormal wear of brushes, and that mechanical vibrations occur due to the torque pulsations. As a result, it is desirable to reduce the pulsating amplitude $\Delta I_m$ of the motor current as far as possible.

In order to reduce the pulsating amplitude, heretofore, it has been proposed (1) to increase ON and OFF repetition frequency ($f = 1/T_{on}+T_{off}$) of the chopper circuit and (2) to increase the inductance L in the series circuit. These measures, however, have been difficult in practice owing to a limitation subjected to the chopper circuit in its characteristic, weight and the like.

SUMMARY OF THE INVENTION

An object of the invention is to provide a control device whose chopper circuit has an excellent characteristic and is light in weight and which can reduce the pulsating amplitude of a motor current.

Another object of the invention is to provide an automatic control device whose chopper circuit has an excellent characteristic and is light in weight and which can reduce the pulsating amplitude of the motor current.

These and other desirable objects are attained, according to this invention, by a battery change-over thyristor circuit for controlling the series-parallel change-over operation for the battery groups and by a battery change-over signal generator circuit for affecting the series-parallel change-over operation control of the battery change-over thyristor circuit when the deviation between the output from a current detector circuit and the output from an accelerator signal generator circuit arrives at a predetermined value.

According to another important feature of the invention, this battery change-over signal generator circuit is operated in response to the output signal from the maximum value of α detector circuit supplied with the output signal produced in response to the deviation between the current detector circuit and the accelerator signal generator circuit and for detecting a predetermined maximum value to produce a step-up signal and in response to the output signal from the minimum value of α detector circuit supplied also with the output signal produced in response to the deviation between the current detector circuit and the accelerator signal generator circuit and for detecting a predetermined minimum value to produce a step-down signal.

These features of the invention are described in greater detail in the following description of certain embodiments. This description refers to the accompanying drawings.

BRIEF DESCRIPTION OF THE DRAWINGS

FIG. 1 is a circuit diagram showing one embodiment of the battery change-over thyristor circuit inclusive of a thyristor chopper circuit according to the invention;

FIG. 2 is a circuit diagram showing the thyristor chopper circuit shown in FIG. 1;

FIG. 3 is a table for illustrating the operation of the thyristor chopper circuit shown in FIG. 1;

FIG. 4 is a time chart for illustrating the operation of the battery change-over thyristor circuit shown in FIG. 1;

FIG. 5 is a block diagram showing all of the electrical components of the device according to the invention;

FIG. 6 is a circuit diagram showing the gate pulse generator circuit shown in FIG. 5;

FIG. 7 is a circuit diagram showing the battery change-over signal generator circuit;

FIGS. 8a and 8b are graphs which illustrate operating characteristics of the time detector circuits shown in FIG. 5, respectively;

FIG. 9 is a curve that is used in explaining the operating characteristic of the chopper time ratio control circuit shown in FIG. 5;

FIG. 10 is a circuit diagram showing the pulse delay circuit shown in FIG. 7;

FIG. 11 is a time chart for illustrating the operation of the gate pulse generator circuit shown in FIG. 10 and battery change-over signal generator circuit shown in FIG. 7; and FIG. 12 is a time chart for illustrating the operation of the gate pulse generator circuit shown in FIG. 6.

DETAILED DESCRIPTION OF THE PREFERRED EMBODIMENTS

Referring to FIG. 1, reference numerals 11 to 14 designate each of four battery groups, respectively. The voltage delivered from each battery group is, for example, 20 to 30 V. These battery groups are connected in series through thyristors 61 to 63. The positive electrode of the battery group 11 is connected to a conductor 111, while the negative electrode of the battery group 14 is connected to a conductor 141. Provision is made of diodes 71 to 73 whose cathodes are connected in common to the conductor 111. The anodes of the diodes 71 and 72 are connected to the positive electrodes of the battery groups 12 and 13, respectively. The anode of the diode 73 is connected through a diode 74 to the positive electrode of the battery group 14. In addition, provision is made of diodes 75 to 77 whose anodes are connected in common to the conductor 141. The cathodes of the diodes 75 and 76 are connected to the negative electrodes of the battery groups 12 and 13, respectively. The cathode of the diode 77 is connected through a diode 78 to the negative electrode of the battery group 11. Reference numeral 2 designates a thyristor chopper circuit, 31 an armature of a direct current motor, 32 a series field coil, 4 a smoothing reactor, 5 a free wheel diode, and 8 a motor current detector.

In FIG. 2 is shown one embodiment of the thyristor chopper circuit 2 shown in FIG. 1 and which is composed of a backward conductive type thyristor 21 connected between an input terminal $a$ and an output terminal $b$, a commutation auxiliary thyristor 22 of a backward conductive type, a commutation condenser 23, a commutation reactor 24, a charging impedance 25 connected to a charging terminal C, and a reverse current blocking diode 26.

The change-over thyristor circuit shown in FIGS. 1 and 2 will operate as follows.

Step 1 (when the motor is rotated at a low speed).

If the thyristors 61 to 63 are held at their OFF conditions, the battery groups 11 to 14 are connected in parallel across the conductors 111 and 141. Let the voltage of each battery group be one-fourth $E_b$, then the average output voltage $V_{m1}$ from the thyristor chopper circuit 2 is given by $$V_{M1} = \text{one-fourth } E_b \cdot \alpha \qquad (2)$$

where $$\alpha = \frac{T_{ON}}{T_{ON} + T_{OFF}}.$$

This shows that the pulsating amplitude $\Delta I_m$ of the motor current derived from the equation (1) is also reduced by one-fourth. However, the maximum output voltage $V_{M1max}$ from the thyristor chopper circuit 2 is one-fourth $E_b$ so that the controllable maximum speed of the motor is also reduced by one-fourth.

Step 2 (when the motor is rotated at a medium speed).

In this step, the thyristors 61 and 63 are ignited in synchronism with the ignition of the main thyristor 21 of the thyristor chopper circuit 2. In this condition, the two battery groups 11 and 12 are connected in series each other and the two battery groups 13 and 14 are also connected in series each other. These two series are connected in parallel across the conductors 111 and 141. As a result, the maximum output voltage $V_{m2max}$ from the thyristor chopper circuit 2 becomes one-half $E_b$. The controllable medium output voltage $V_{m2}$ is given by $$V_{M2} = \text{one-fourth } E_b (1+\alpha) \qquad (3)$$

In this case, if the thyristors 61 and 63 are ignited in synchronism with the ignition of the chopper circuit 2, the output voltage $V_{M2}$ is given by $$V_{M2} = \text{one-half } E_b \cdot \alpha \qquad (3')$$

The pulsating amplitude of the motor current becomes increased so that both the conduction period of the thyristors 61 and 63 and the chopper circuit 2 are controlled such that the output defined by the equatin (3) is obtained.

Step 3 (when the motor is rotated at a high speed).

This step is controlled by all of the thyristors 61 to 63 and by the main thyristor 21. If all of the thyristors 61, 62 and 63 are simultaneously ignited, all of the battery groups 11 to 14 are connected in series across the conductors 111 and 141. In this step, the average output voltage $V_{M3}$ from the thyristor chopper circuit 2 is given by $$V_{M3} = \frac{1}{2} \cdot E_B (1+\alpha) \qquad (4)$$

the maximum output voltage becomes $E_b$.

In FIG. 3 is shown a table illustrating the above described control operations.

The above-mentioned operation will now be described in detail with reference to FIG. 4.

In the first place, the operation of the thyristor chopper circuit 2 shown in FIG. 2 will be described. The commutation condenser 23 shown in FIG. 2 is charged beforehand with polarities shown through the charging impedance 25 and the like to render the thyristor 21 conductive. Under such condition, if it is desired to extinguish the thyristor 21, the auxiliary 22 is ignited to produce an oscillation current with the aid of the condenser 23 and reactor 24. This oscillation current flows in a direction from the thyristor 21 through the thyristor 22 to the reactor 24 and then flows in the opposite direction. If the same constant of this oscillation circuit is defined such that the peak value of the oscillation current is 1.5 to 2.0 times larger than the load circuit, the forward current flowing through the thyristor 21 is completely erased to extinguish the main thyristor 21.

Let the capacity of the commutation condenser 23 be $C_o$, the inductance of the reactor 24 be $L_o$, and the charging voltage of the condenser 23 be $V_{co}$, then the oscillation current $i$ is given by $$i = \frac{V_{co}}{\sqrt{L_o/C_o}} \sin \sqrt{L_o \cdot C_o} \; t \qquad (5)$$

As seen from the equation (5), if the charging voltage $V_{co}$ of the condenser 23 is low, the communication condenser 23 and the reactor 24 should be of large capacity.

As a result, the operation such as the above mentioned steps 1 and 2 where the input voltages to the chopper circuit 2 are $\frac{1}{4}$ $E_b$ and $\frac{1}{2}$ $E_b$, respectively, is undesirable. Thus, even in such a case, it is essential to connect all of the battery groups 11 to 14 in series so as to charge the condenser 23 with the overall voltage $E_b$ of these battery groups.

In FIG. 4 is shown a time chart prepared by taking the above condition into consideration.

In the step 1, all of the thyristors 61 to 63 are simultaneously ignited at the time $t_1A$. As a result, to the input terminal $a$ of the chopper circuit 2 is applied the overall voltage $E_b$ of the battery groups by which the condenser 23 is charged. When the charging of the condenser 23 has been completed, the current becomes zero so that the thyristors 61 to 63 are naturally extinguished. Then, if the thyristor 21 is ignited at the time $t_1AA$, to the output terminal $b$ of the chopper circuit 2 is delivered the $\frac{1}{4}$ $E_b$ voltage. This voltage is maintained until the auxiliary thyristor 22 is ignited at the time $t_2$ so as to extinguish the main thyristor 21. The above operations are repeated to control the output voltage from the chopper circuit 2.

In the step 2, all of the thyristors 61 to 63 are simultaneously ignited at the time $t_1A$ to charge the condenser 23. Then, the main thyristor 21 and the thyristors 61 and 63 are simultaneously ignited at the time $t_{1aa}$ to make the output voltage from the chopper circuit 2, ½ Eb. If the chopper circuit 2 is once extinguished at the time $t_2$, the current through the thyristors 61 and 63 becomes also zero to naturally extinguish these thyristors 61 and 63.

If the main thyristor 21 only is ignited at the time $t_{2a}$, the condition becomes similar to the ON condition of the chopper circuit 2 at the step 1. As a result, the output voltage from the chopper circuit 2 becomes ¼ Eb. In this step 2, the auxiliary thyristor 22 is ignited at the time $t_1$ prior to the ignition of the thyristors 61 to 63 at the time $t_{1a}$ so as to once extinguish the chopper circuit 2.

In the step 3, the main thyristor 21 and the thyristors 61 to 63 are simultaneously ignited at the time $T_{1aa}$ to make the output voltage from the chopper circuit 2, ½ Eb. All of these thyristors are once extinguished at the time $t_2$ and then the thyristors 21, 61 and 63 are simultaneously ignited at the time $t_{2a}$ to make the output voltage from the chopper circuit 2, ½ Eb. In this step 3, the chopper circuit 2 is once extinguished at the time $t_2$ in the same manner as in the step 2. In this step 3, however, it is not necessary to extinguish the chopper circuit 2 at the time $t_1$ as is encountered in the step 2.

In FIG. 5 is shown a control device for satisfying the above described control conditions and for automatically selecting either one step from the steps 1, 2 and 3 in dependence with the driving condition of the motor. In FIG. 5, reference numeral 2 designates a chopper circuit, 3 a direct current motor, and 6 a change-over thyristor circuit (thyristors 61 to 63 shown in FIG. 1). In addition, reference numeral 100 designates a gate pulse generator circuit which can deliver gate pulses required for the thyristors 21 and 22 of the chopper circuit 2 and for the thyristors 61 to 63 of the change-over thyristor circuit 6, 200 a battery change-over signal generator circuit for defining conditions of the gate pulses $x_1$ and $x_2$ delivered to the change-over thyristor circuit 6 in response to the steps 1 to 3, 300 a chopper pulse generator circuit for defining reference gate pulses $P_1$ and $P_2$ required for the thyristors 21 and 22 of the chopper circuit 2, 400 a time ratio control circuit for controlling the time ratio through the chopper circuit 2, 510, 520 Schmidt trigger circuits each having a hysteresis characteristic and for establishing the operation of the device, 530 an αmax detector circuit for detecting the time at which the control signal of time ratio for the chopper circuit 2 arrives at its maximum value and for delivering a step-up signal, 540 an αmin detector circuit for detecting the time at which the control signal of time ratio of the chopper circuit 2 arrives at its minimum value and for delivering a step-down signal, and 600 an amplifier for amplifying the deviation between the output from an accelerator signal generator circuit 700 and the output from a motor current detector circuit 800.

In FIG. 6 is shown the gate pulse generator circuit 100 shown in FIG. 5. In FIG. 7 is shown the battery change-over signal generator circuit 200 shown in FIG. 5. Referring to FIGS. 6 and 7, $PA_1$ to $PA_4$ show pulse amplifier circuits, respectively, $NO_1$ to $NO_6$ OR gates, respectively, $NA_1$ to $NA_{10}$ NAND gates, respectively, $OM_1$ to $OM_3$ one shot multivibrator circuits for delivering delay pulses, respectively, EO an exclusive OR gate, $FF_1$ and $FF_2$ flip-flops, respectively, $NT_1$ to $NT_5$ NOT circuits, respectively, and $DL_1$ and $DL_2$ time delay circuits, respectively. References illustrating signals at respective terminals of the circuits shown in FIGS. 6 and 7 correspond to those shown in FIG. 5, respectively.

The circuit arrangement shown in FIG. 5 is capable of controlling the time ratio control circuit 400 in response to the deviation (Us–Uc) between the output signal Us from the accelerator signal generator circuit 700 and the output signal Uc from the motor current detector circuit 800.

In FIG. 9 is shown the relation between the output U(α) from the amplifier circuit 600 and the time ratio α of the chopper circuit 2. The time ratio α is defined by the relation between the output $P_1$ from the chopper pulse generator circuit 300 (the reference pulse signal making the chopper circuit ON) and the output $P_2$ from the chopper pulse generator circuit 300 (the reference pulse signal making the chopper circuit OFF). In the steps 2 and 3, the time ratio α is defined by a ratio (Ton/T) where Ton is the time during which the chopper circuit 2 is ON and the output voltage from the chopper circuit 2 is the highest and T is one period of the output voltage.

In FIG. 8(a) is shown the relation between the input signal Uα to the αmax detector circuit 530 and the output signal U from the Schmidt trigger circuit 510 shown in FIG. 5 and in FIG. 8(b) is shown the relation between the input signal Uα to the αmin detector circuit 540 and the output signal D from the Schmidt trigger circuit 520 shown in FIG. 5.

The output signal U from the Schmidt trigger circuit 510 detects a condition where the control signal of time ratio for chopper is not less than substantially 0.98 and the accelerator is substantially fully opened and the output U arrives at the level 1 and the output D from the Schmidt trigger circuit 520 detects another condition where the control signal of time ratio for chopper is not larger than substantially 0.03 and the accelerator is substantially fully closed and the output D arrives at the level 1.

As seen from the circuit diagram shown in FIG. 5, the steps are changed over one from the other under the following conditions.

In case of changing over the step 1 to the step 2, an accelerator pedal (not shown) is pushed to deliver an accelerator signal and the motor current is reduced to a value which is less than a limit value. This condition corresponds to the case in which the signal U(α) makes the time ratio α of the chopper circuit 2 substantially 100%. This condition is detected by the αmax circuit 530 and the step 1 is changed over to the step 2. This is also applied to the case of changing over the step 2 to the step 3.

In case of changing over the step 3 to the step 2 or changing over the step 2 to the step 1, if the deceleration instruction is delivered, for example, in the step 3 and if the motor current is increased beyond a limit value (A predetermined value), this condition corresponds to the case in which the signal Uα makes the time ratio of the chopper circuit 2 substantially 0%. This condition is detected by the αmin circuit 540 and the step 3 is changed over to the step 2.

Thus, the αmax and αmin detector circuits 530 and 540 make it possible to detect the condition of the signal Uα to obtain the step-up signal U and step-down signal D, respectively.

In FIG. 7 is shown a battery change-over signal generator circuit in which the step-up signal U and the step-down signal D are counted to obtain the conditions of the steps 1, 2 and 3.

The circuit shown in FIG. 7 will operate as follows.

(a) The output $x_1$ is changed into the preceding condition by means of both the step-up signal U and the step-down signal D. The output $x_1$ is not changed into the preceding condition if the step-up signal U is present in the step 3 or if the step-down signal D is present in the step 1.

(b) The output $x_2$ always derives the condition 1 by means of the step-up signal U.

(c) The output $x_2$ derives the condition O by means of the step-down signal D except the condition of the step 3.

In FIG. 6, L is a signal terminal by which the gate pulses are delivered or stopped in a given sequence in response to the pushing condition of the accelerator pedal, brake pedal and the like.

In FIG. 7, CL is a clear signal terminal for the flip-flops $FF_1$ and $FF_2$ and is operated prior to the operation of the battery change-over signal generator circuit 200.

The time delay circuits $DL_1$ and $DL_2$ shown in FIG. 7 must prevent the operation of the flip-flops $FF_1$ and $FF_2$ from becoming unstable. For this purpose the following relations are defined.

The raising time of the input $x_{1a} \leq$ The lowering time of the input $x_{2a}$ The lowering time of the input $x_1A \geq$ The raising time of the input $x_{2a}$.

In FIG. 10 is shown one embodiment of the time delay circuit $DL_1$ or $DL_2$ for defining the above relations.

In FIG. 10, C shows a condenser, $R_1$ and $R_2$ are resistors, D shows a diode, and $NT_6$ and $NT_7$ are NOT circuits, respectively. The above relations are defined by a combination of the resistors $R_1$, $R_2$ and the diode D which permits the charging time constant of the condenser C to be changed from its discharging time constant.

The circuits shown in FIGS. 6 and 7 will operate as follows. The signal to the input terminal T of the T type flip-flop $FF_1$ shown in FIG. 7 is given by the following logic equation.

$$T = \overline{U(x_1A + \overline{x}_2A) \cdot Dx_2A}.$$

The logic equations for the signals to the input terminal R and to the input terminal S of the R-S type flip-flop $FF_2$ are given by $$R = \overline{D} + D \cdot x_1$$
$$S = \overline{U}.$$

Let the step-up signal U and the step-down signal D be those shown in FIG. 11a and FIG. 11b, respectively, then the circuit shown in FIG. 7 operates in a manner as illustrated in FIGS. 11c to 11k. Thus, the relations between the conditions of the output signals $x_1$ and $x_2$ with respect to the steps 1, 2 and 3 are given by the following table.

| Signal | Step 1 | Step 2 | Step 3 |
|---|---|---|---|
| $x_1$ | 0 | 1 | 0 |
| $x_2$ | 0 | 1 | 1 |

In FIG. 6, let the gate pulse signals for operating the thyristors 21 and 22 be $G_{21}$ and $G_{22}$, respectively, and let the gate pulse signals for operating the thyristors 61, 62 and 63 be $G_{61}$, $G_{62}$ and $G_{63}$, respectively, then the relations between the gate pulse signals $G_{21}$, $G_{22}$, $G_{61}$, $G_{62}$ and $G_{63}$ and the reference pulse signals $P_1$ and $P_2$ are given by the following logical equations $$G_{21} = P_1(T_{d_1} + T_{D_2}) + x_2 P_2(T_{D_3})$$

$$G_{22} = x_1 P_1 + P_2$$

$$G_{61} = P_1(T_{D_1}) + x_2 P_1(T_{D_1} + T_{D_2}) + x_3 P_2(T_{D_3}),$$

$$G_{62} = P_1(T_{D_1}) + x_3 P_1(T_{D_1} + T_{D_2}), \text{ and}$$

$$G_{63} = G_{61}$$

where $P_1(T_{D_1})$ and $P_2(T_{D_3})$ are pulses delayed from the reference pulse signals $P_1$ and $P_2$ delivered from the one shot multivibrators $OM_1$ and $OM_3$ by a time $T_{D_2}$ with the aid of the one shot multivibrators $OM_3$. $x_3$ is an output delivered from the exclusive OR gate EO and given by the following equation $$x_3 = \overline{x}_1 \cdot x_2 + x_1 \cdot \overline{x}_2$$

In FIG. 12 are shown the gate pulses to be delivered to the thyristors 21 and 22 shown in FIG. 2 and the thyristors 61, 62 and 63 shown in FIG. 1 with respect to the reference pulses $P_1$ and $P_2$.

As explained hereinbefore, the use of the measures described provides the important advantage that the battery groups are automatically turned over from series connection into parallel connection and vice versa in response to the signal for controlling the current ratio of the chopper circuit.

What is claimed is:

1. In a direct current motor control device for use in a battery-powered automobile having a direct current motor and a plurality of battery groups for supplying a direct current to said motor, a battery change-over thyristor circuit including a chopper circuit for changing over said battery groups from series connection to parallel connection and vice versa with respect to said motor, an accelerator signal generator connected to an accelerator pedal for delivering an output voltage in response to the operation of the accelerator pedal, a current detector circuit connected between said motor and said accelerator signal generator for delivering an output voltage in response to operation of the motor, and a turn-over signal generator circuit connected between said accelerator signal generator circuit and said motor current detector circuit and connected to said battery turn-over thyristor circuit for controlling said series-parallel change-over operation of said battery change-over thyristor circuit when the deviation between the output from said current detector circuit and the output from said accelerator signal generator circuit arrives at a predetermined value, the improvement comprising a αmax detector circuit connected to a common junction point between said current detector circuit and said accelerator signal generator circuit and said change-over signal generator circuit for detecting a predetermined maximum value in response to said deviation between the output from said current detector circuit and the output from said accelerator signal generator circuit to produce a step-up signal, and an αmin detector connected to the common junction point between said current detector circuit and said accelerator signal generator circuit on the one hand, and to said change-over signal generator circuit on the other hand, and for detecting a predetermined minimum value in response to said deviation between the output from said current detector circuit and the output from said accelerator signal generator circuit to produce a step-down signal, whereby said battery turn-over signal generator circuit becomes operated in response to the output signals from said $\alpha$max and $\alpha$min detector circuits.

* * * * *